UNITED STATES PATENT OFFICE.

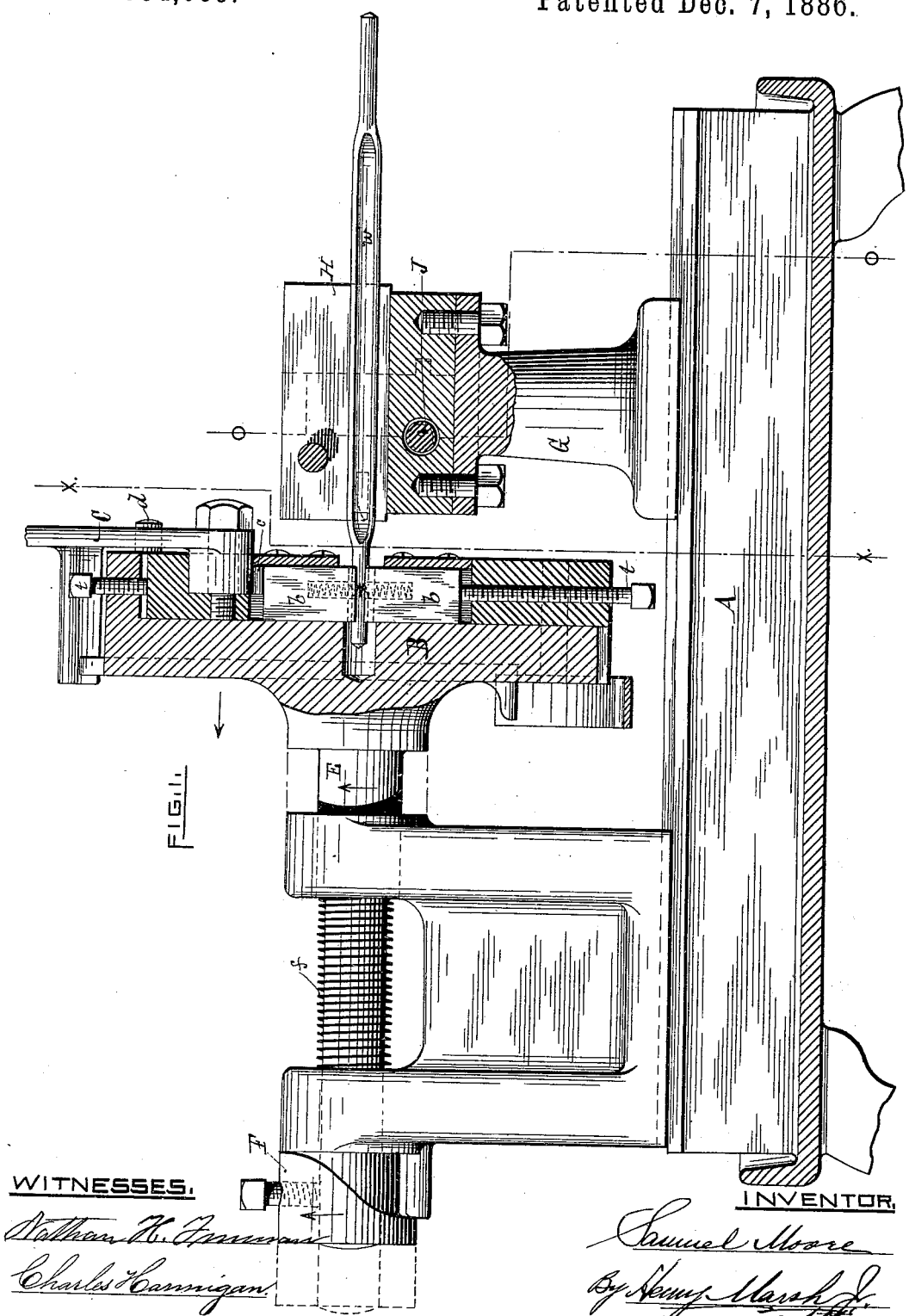

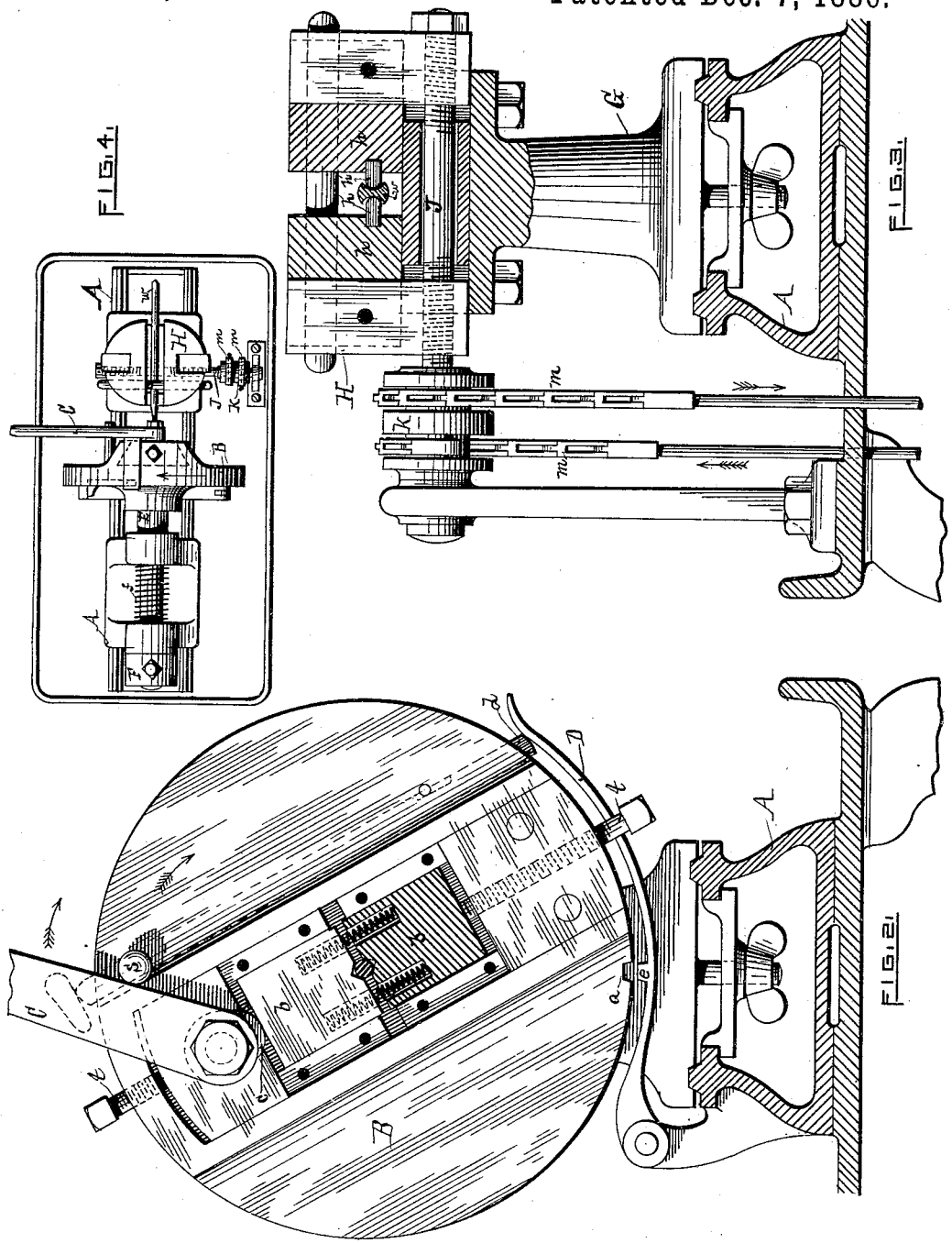

SAMUEL MOORE, OF PROVIDENCE, RHODE ISLAND, ASSIGNOR TO SULLIVAN FENNER, OF SAME PLACE.

MACHINE FOR MAKING TWIST-DRILLS.

SPECIFICATION forming part of Letters Patent No. 354,069, dated December 7, 1886.

Application filed May 21, 1886. Serial No. 202,838. (No model.)

*To all whom it may concern:*

Be it known that I, SAMUEL MOORE, a citizen of the United States, residing in the city and county of Providence, in the State of Rhode Island, have invented a new and useful Improvement in Machines for Making Twist-Drills, of which the following is a specification.

In the art of making twist-drills it is necessary that the amount of twist imparted to the drill should be accurately determined and uniformly made in each drill of any given size.

The object of my invention is to provide means by which the amount of twist can be accurately fixed and started in each individual of any number of blanks of any given size.

My invention consists of the combination and arrangement in a machine of an oscillating chuck and a stationary chuck, the axes of the two being at right angles one to the other, with means provided for operating the jaws of each chuck independently of the other, and other means provided for determining the amount of twist to be imparted to the blank.

I will explain the mechanism by which I accomplish my object by reference to the accompanying drawings, in which—

Figure 1 is an elevation partly in section. Fig. 2 is a face view of the oscillating chuck taken on the broken line $x$ $x$ of Fig. 1. Fig. 3 is a face view of the stationary chuck, partly in section, on line $o$ $o$ of Fig. 1. Fig. 4 is a plan view of my invention.

Similar letters of reference indicate similar parts in all the views.

A represents a lathe-bench, upon which I mount in the well-known way a chuck, B, which has jaws $b$ $b$, independently adjustable by tap-bolts $t$ $t$ and operated to open and close by a lever-arm, C. I have in the use of this form of chuck found it of advantage to use the coil-springs shown to accelerate the opening of the jaws when the lever-arm C is relieved from pressure. The chuck is held in position by a spring-catch, D, provided with a lug or dog, $e$, which engages a notch, $a$, in the periphery of the chuck. This dog $e$ is thrown out to release the chuck by a rod, $d$, actuated by a cam-lug on the lever-arm, C, as shown by the dotted lines in Fig. 1. The chuck rotates on its arbor E, which has on its outer end a cam, F, which I make of a pitch corresponding to the pitch of the twist of the drill. I also coil upon the arbor E a spring, $f$.

G represents a slide-rest, upon which I mount a chuck, H, whose jaws $h$ $h$, lying in the same horizontal plane, are actuated to open and close by a screw, J, which is operated by treadles (not shown) connected with the straps, belts, or chains $m$ $m$, passing over the grooved pulley $k$ in opposite directions. $w$ represents the drill-blank.

In the practical operation of my invention, the grooved drill-blank being inserted, as shown in Fig. 1, the jaws of the oscillating chuck gripping the shank, and the fingers of the jaws of the horizontal chuck entering the grooves in the opposite faces of the blank, power is applied to the lever-arm to carry it over in the direction indicated by the arrow in Fig. 2. At the first movement of the lever-arm the cam $c$ presses the jaws upon the blank. Then the cam-lug rides up on the rod $d$, pressing it down against the spring D to free the dog $e$ from the slot $a$. The lever-arm C then strikes the lug $s$ and carries the chuck round in the direction indicated by the arrow in Fig. 2. When the blank is first inserted in the chucks, the fingers $h'$ $h'$ of the jaws $h$ $h$ are made to grip and hold in the grooves of the blank by working the treadles connected with the chains or belts $m$ $m$, one treadle serving to open and the other to close the jaws. The blank being held by the jaws of the two chucks, the lever-arm C is operated, as above described, and the oscillating chuck and its mandrel E are rotated, causing the cam F to ride up on its inclined face and draw the chuck back in the direction indicated by the arrow in Fig. 1. It is obvious that the chuck H being at all times stationary and the chuck B rotating, as described, the blank $w$ will be both twisted and withdrawn a certain distance through the jaws $h'$ $h'$, and the requisite amount of twist will be imparted to that portion of the blank lying between the two chucks. The blank may then be removed and inserted in a machine heretofore patented by me for twisting drills.

I do not confine myself to the use of the specific form of chucks shown and described herein and in the drawings. Any two chucks will answer which grip the blank with their jaws at an angle each to the other; or, in other words, so long as one chuck is stationary and the other chuck is capable of being rotated to bring the central line of its jaws at any desired angle to the central line of the jaws of the stationary chuck and in a plane at right angles to the plane of the stationary chuck, the principle of my invention is embodied.

I claim as my invention and desire to secure by Letters Patent—

1. In a machine for starting the twist in a drill-blank, the combination, with an oscillating chuck, B, provided with means for rotating it, of means, as the cam F, for determining the amount or degree of twist to be imparted to the blank, and a stationary chuck provided with means for opening and closing its jaws, all arranged for joint operation and adapted to serve as specified.

2. The combination of a chuck, as B, mandrel E, cam F, and lever-arm C, all arranged for joint operation as specified.

3. The lever-arm C, provided with a cam-lug, the rod d, and spring-catch D, in combination with each other and with a chuck, B, all arranged as specified, and adapted to serve, as described, to operate the jaws of the chuck, to rotate the chuck and impart the twist to the blank.

4. The combination of the cam F and mandrel E with an oscillating chuck, as shown, whereby the twist imparted to the blank is caused to correspond in pitch with the pitch of the cam F, as shown and described.

In testimony whereof I have hereunto set my hand, in presence of two witnesses, this 18th day of May, 1886.

SAMUEL MOORE.

Witnesses:
HENRY MARSH, Jr.,
NATHAN H. FREEMAN.